(12) United States Patent
Naim et al.

(10) Patent No.: US 9,479,980 B1
(45) Date of Patent: Oct. 25, 2016

(54) METHODS AND SYSTEMS FOR CELL SELECTION USING UPLINK LOAD MEASUREMENTS

(71) Applicant: Sprint Spectrum L.P., Overland Park, KS (US)

(72) Inventors: Muhammad A. Naim, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 231 days.

(21) Appl. No.: 14/327,354

(22) Filed: Jul. 9, 2014

(51) Int. Cl.
| | | |
|---|---|---|
| *H04W 4/00* | (2009.01) | |
| *H04W 36/00* | (2009.01) | |
| *H04W 72/04* | (2009.01) | |
| *H04J 11/00* | (2006.01) | |
| *H04L 5/00* | (2006.01) | |

(52) U.S. Cl.
CPC ..... *H04W 36/0083* (2013.01); *H04W 72/0413* (2013.01); *H04J 11/005* (2013.01); *H04L 5/0007* (2013.01); *H04L 5/0073* (2013.01)

(58) Field of Classification Search
CPC .......... H04W 36/0083; H04W 72/0413; H04W 28/08; H04W 72/0426; H04J 11/005; H04J 5/0007; H04J 5/0073; H04B 7/2618
See application file for complete search history.

(56) References Cited

U.S. PATENT DOCUMENTS

| | | | | |
|---|---|---|---|---|
| 9,014,064 B2 * | 4/2015 | He | ...................... | H04W 76/048 370/280 |
| 9,131,400 B2 * | 9/2015 | Bennis | .................. | H04W 28/08 |
| 9,338,769 B1 * | 5/2016 | Naim | ................ | H04W 72/0413 |
| 9,350,477 B1 * | 5/2016 | Jung | .................... | H04W 72/082 |
| 2014/0269300 A1 * | 9/2014 | Bennis | .................. | H04W 28/08 370/235 |
| 2014/0355469 A1 * | 12/2014 | Kang | ..................... | H04J 11/005 370/252 |
| 2015/0092875 A1 * | 4/2015 | Kim | ..................... | H04B 7/0478 375/267 |
| 2015/0373694 A1 * | 12/2015 | You | ....................... | H04L 5/0051 370/329 |

OTHER PUBLICATIONS

Prof. Ziaohu You, Cell Edge Performance of Cellular Mobile Systems, National Mobile Comm. Research Lab., Southeast University, Shanghai Wireless Comm. Research Center, Sep. 20, 2010, 32 pages.
Award Solutions, LTE University, LTE 901, LTE Network Reference, Mar. 10, 2011, one page.
Award Solutions, LTE University, LTE 902, LTE-EPC and IMS Reference, Mar. 10, 2011, one page.
Single-carrier FDMA, downloaded from the World Wide Web at https://en.wikipedia.org/wiki/Single-carrier_FDMA, on Jun. 25, 2014, pp. 1-4.

(Continued)

*Primary Examiner* — Brian O'Connor

(57) ABSTRACT

Aspects of selecting a base station for a UE device are described. The UE device or a wireless network component (e.g., a base station) can determine RF uplink use values of a coverage area. The RF uplink use values can be received from one or more base stations and can be based on a subframe or other time segment. A processor can determine a base station having a greatest number of subframes with at least one resource block available. If the base stations have an equal number of subframes having at least one resource block available, the processor can determine which base station has a greatest number of subframes having at least two resource blocks available (or three, etc. if additional ties exist). A selection of the base station can be based on the processor's determination and whether the UE device is located within an edge of a coverage area.

25 Claims, 9 Drawing Sheets

(56) References Cited

OTHER PUBLICATIONS

Teletopix, Teletopix Resource Block Architecture, downloaded from the World Wide Web at http://www.teletopix.org/4g-lte/lte-frame-structure-and-resource-block-architecture-attachment-lte-resource-block-architecture/ on Jan. 28, 2013, two pages.
Linear Technology, Dual 2.3 GHz to 4.5GHz High Synamic Range Downconverting Mixer, LTC5593, Oct. 11, 2011, pp. 1-28.
LTE OFDM, Orthogonal Frequency Division Multiplex, downloaded from the World Wide Web at http://www.radio-electronics.com/info/cellulartelecomms/lte-long-term-evolution/lte-ofdm-ofdma-scfdma.php on May 19, 2014, 4 pages.
IXIA, SC-FDMA Single Carrier FDMA in LTE, Jun. 25, 2014, 16 pages.
Long Term Evolution, LTE, Uplink and Downlink of LTE, downloaded from the World Wide Web at http://desmondkhoolte.blogspot.com/2012/03/uplink-and-downlink-of-lte.html on May 24, 2014, 2 pages.
Scott Baxter, LTE Long Term Evolution, Introduction, Air Interface, Core Network, Operation, Course 511, V3.0, Nov. 2013, 83 pages.
U.S. Appl. No. 14/327,419, entitled "Methods and systems for using a load metric based on time and variance of using RF resources to select an RF coverage area," filed Jul. 9, 2014, 57 pages.

\* cited by examiner

METHODS AND SYSTEMS FOR CELL SELECTION USING UPLINK LOAD MEASUREMENTS

BACKGROUND

Unless otherwise indicated herein, the elements described in this section are not prior art to the claims and are not admitted to be prior art by inclusion in this section.

A user equipment (UE) device configured for wireless communications can carry out wireless communications, in part, by transmitting signals to a base station on a radio frequency (RF) uplink and receiving signals from the base station using an RF downlink. The signals transmitted by the base station can form a coverage area (e.g., a cell or sector) in which the UE device can carry out communication using the base station. In some cases, a UE device can be configured as a mobile UE device that moves from a location near the base station to a location at an edge of the base station's coverage area. As the UE device moves farther away from the base station and closer to the edge of the coverage area, the power required to transmit a signal from the UE device to the base station typically increases. A battery providing power to operate the UE device typically loses its charge more quickly when the UE device is using greater amounts of power to transmit signals to the base station. Methods and systems that pertain to a UE device using less power can be beneficial in many ways.

OVERVIEW

This application describes several example embodiments, at least some of which pertain to selection of a coverage area or cell, or a base station providing the coverage area or cell, for a UE device and a communication system serving the UE device. The selection of the coverage area, cell or base station can be carried out by the UE device or a device (e.g., the base station) within the communication system in which the UE device and base station operate. The selection can be based on a measure of using wireless uplink transmission segments, such as uplink frames or uplink subframes, and which base station has a greatest number of transmission segments with at least one available resource block (or two, three, etc. available resource blocks in event of the base stations having an equal number of subframes with at least one available resource block).

In a first respect, an example embodiment can take the form of a method including storing, by a computer-readable medium, wireless uplink subframe use values (WUSUV) pertaining to a first base station, determining, by a processor from among the stored WUSUV pertaining to the first base station, a first set of WUSUV pertaining to the first base station, and transmitting, by a transmitter using a wireless downlink, the first set of WUSUV pertaining to the first base station.

In another respect, an example embodiment can take the form of a method including storing, by a computer-readable medium, WUSUV pertaining to a first base station and WUSUV pertaining to a second base station, determining, by a processor from among the stored WUSUV pertaining to the first base station, a first set of WUSUV pertaining to the first base station, determining, by the processor from among the stored WUSUV pertaining to the second base station, a first set of WUSUV pertaining to the second base station, determining, by the processor based, at least in part, on the first set of WUSUV pertaining to the first base station and the first set of WUSUV pertaining to the second base station, a selected base station from among the first base station and the second base station, and transmitting, by a transmitter to a UE device over a wireless downlink, an indication of the selected base station.

In yet another respect, an example embodiment can take the form of a method including receiving, by a user equipment (UE) device, a first set of WUSUV pertaining to a first base station and a first set of WUSUV pertaining to a second base station, determining, by the UE device based on, at least in part, the first set of WUSUV pertaining to the first base station and the first set of WUSUV pertaining to the second base station, a selected base station to perform a UE device transition, wherein the selected base station is one of the first base station and the second base station, and performing, by the UE device, the UE device transition to the selected base station.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

I. Introduction

This description describes the example embodiments and several figures accompanying the description. The example embodiments can be applicable to a UE device that is operating in an idle mode (e.g., the UE device is camped on, but is not connected to, a base station) and when the UE device is operating in a connected mode (e.g., the UE device is connected to a base station for carrying out a data session, such as a voice call or an Internet browsing session).

A device, such as a UE device or a base station in a communication system including the UE device and the base station can determine use values for RF uplink resources for two or more base stations and select a base station for the UE device. The use values can correspond to distinct transmission segments of the RF uplink, such as subframes, frames or slots. The selection of the base station for the UE device can occur when the UE device is operating within an edge of a cell (e.g., an edge of the coverage area provided by a base station).

This description describes several example embodiments and several figures accompanying the description. Within the description and figures, the articles "a," "an," or "the" are used to introduce elements of the example embodiments. The intent of using those articles is that there is one or more of the elements. The intent of using the conjunction "or" within a list of at least two terms in the description or figures is to indicate any of the listed terms or any combination of the listed terms. The use of ordinal numbers such as "first," "second," "third" and so on in the description or figures is to distinguish respective elements rather than to denote a particular order of those elements unless the context of using those terms explicitly indicates otherwise.

The diagrams, depictions, and flow charts shown in the figures are provided merely as examples and are not intended to be limiting. Many of the elements illustrated in the figures or described herein are functional elements that can be implemented as discrete or distributed components or in conjunction with other components, and in any suitable combination and location. Those skilled in the art will appreciate that other arrangements and elements (e.g., machines, interfaces, functions, orders, or groupings of functions or operations) can be used instead. Each element or components of an element shown in the figures or described in this description, alone or in combination with one or more other elements or components of the one or more other elements, can be referred to as a system or a machine. Furthermore, various functions or operations described as being performed by one or more elements can be carried out by a processor executing computer-readable program instructions or by any combination of hardware, firmware, or software.

II. Example System Architecture

Figure 1:
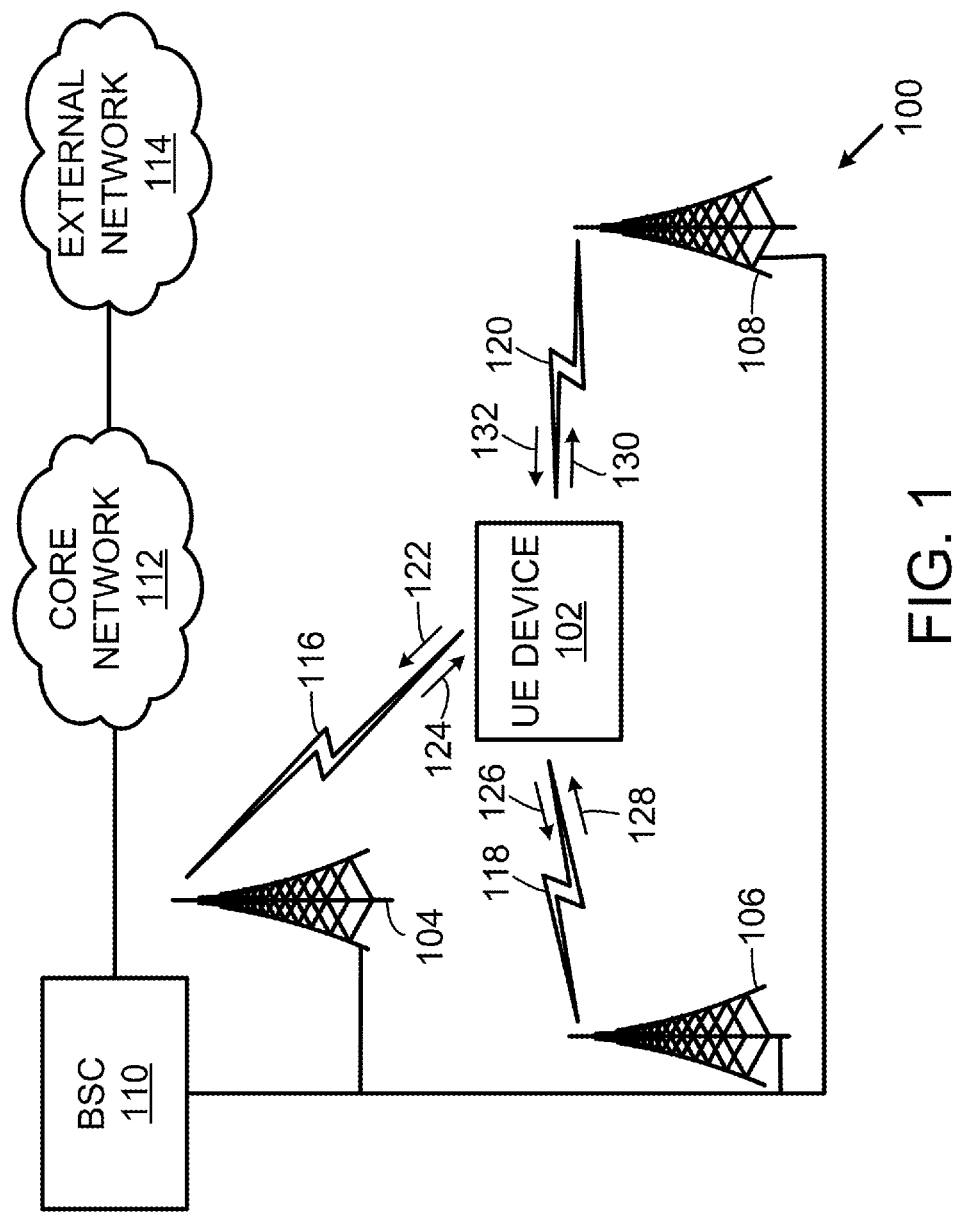
FIG. 1 is a diagram showing a communication system in accordance with the example embodiments described herein.

FIG. 1 is a diagram showing an example communication system 100 in accordance with one or more of the example embodiments disclosed herein. Communication system 100 (or more simply, system 100) includes a UE device 102, base stations 104, 106, and 108, base station controller (BSC) 110, a core network 112, and external network 114. System 100 can include one or more other UE devices, one or more other base stations, one or more other BSCs, one or more other core networks, or one or more other elements, some of which are described below. System 100 can be referred to as a communication network.

Each base station shown in FIG. 1 can provide one or more RF coverage areas (e.g., one or more sectors or one or more cells) in which UE devices, such as UE device 102, can carry out wireless communications using an air interface protocol associated with the RF coverage area(s). Each coverage area can include an edge and a non-edge portion. Typically, the non-edge portion, relative to the edge portion, is closer to the base station. Portions of two or more RF coverage areas can overlap each other. A base station can handover a UE device as the UE device is moved from one RF coverage area to another RF coverage area.

Each RF coverage area can be associated with one or more frequency bands. Each frequency band can be referred to by a single frequency, such as an 800 megahertz (MHz) frequency band. Each frequency band can be wider than a single frequency or include two or more frequency ranges. For instance, an 800 MHz frequency band, used for frequency division duplexing (FDD), can include uplink channels (also known as reverse-link channels) within the range 806-824 MHz, inclusive, and downlink channels (also known as forward-link channels) within the range 851-869 MHz, inclusive. Two distinct frequency ranges, such as the two aforementioned frequency ranges, can be referred to as paired frequency ranges. The range between 824 MHz and 851 MHz can be referred to as a frequency offset. A frequency band or range can be segmented into multiple segments for assigning to separate sub-carriers or sets of sub-carriers. For instance, a frequency band or a portion of a frequency band 180 kHz wide can be segmented into twelve segments 15 kHz wide for assigning to twelve sub-carriers.

FIG. 1 shows RF communication links 116, 118, and 120 between base stations 104, 106, and 108, respectively, and UE device 102. Arrows 122, 126, and 130 in FIG. 1 represent the uplink portions of RF communication links 116, 118, and 120, respectively. Arrows 124, 128, and 132 in FIG. 1 represent the downlink portions of RF communication links 116, 118, and 120, respectively. At any given time, a UE device may be within one or more coverage areas formed by one or more base station or the UE device may not be within any coverage area formed by a base station.

A base station and a UE device can communicate over a frequency band using a radio access technology (RAT) that can be defined, at least in part, by an air interface protocol. Examples of an air interface protocol used by a base station and a UE device include, but are not limited to, long term evolution (LTE), code division multiple access (CDMA), WiMAX®, integrated digital enhanced network (IDEN), global system for mobile communications (GSM), general packet radio service (GPRS), universal mobile telecommunications system (UMTS), enhanced data rates for GSM evolution (EDGE), multichannel multipoint distribution service (MMDS), mobile broadband wireless access (MWBA), WiFi®, and BLUETOOTH®. The LTE protocol was defined by the $3^{rd}$ Generation Partnership Project (3GPP). One or more of the LTE, WiMAX®, and MWBA protocols can use an orthogonal frequency division multiple access (OFDMA) protocol for downlink communications and a single carrier frequency division multiple access (SC-FDMA) protocol for uplink communications.

Base stations 104, 106, and 108 can be configured in any of a variety of base station arrangements. Three particular example base station arrangements are described below. Other example arrangements of one or more of base stations 104, 106, and 108 are also possible.

As a first example, base station 104 can be configured as or include a base station of an evolved UMTS terrestrial radio access network (E-UTRAN) for an evolved system defined by the 3GPP. A radio network including a base station and UE device within an E-UTRAN can operate according to an LTE standard defined by the 3GPP. A base station in a communication system operating within an E-UTRAN or according to the LTE standard can be referred to as an evolved Node B (eNode-B). An e-Node-B can connect directly to core network 112.

In accordance with one or more example embodiments, base station 106 and base station 108 and other base station(s) (not shown) in system 100 can also be configured as or include an e-Node B. A base station of those embodiments can operate using any one of two or more frequency bands used by system 100.

As a second example, base station 106 can be configured as or include a base station of a UMTS terrestrial radio access network (UTRAN) for a 3G system defined by the 3GPP. A radio network, including a base station and UE device within a UTRAN can operate according to a wideband CDMA (W-CDMA) standard defined or adopted by the 3GPP. A base station in a network operating according to the UMTS can be referred to as a Node-B. In accordance with this second example, system 100 can include a radio network controller (RNC) or BSC 110 can be configured as or include an RNC. An RNC can control one or more Node-Bs that connect to the RNC. An RNC can include one or more gateways for connecting to and communicating with core network 112.

In accordance with one or more example embodiments, base station 104 and base station 108 and other base station(s) (not shown) in system 100 can also be configured as or include a Node-B. The base station of those embodiments can operate using any one of two or more frequency bands used by system 100.

As a third example, base station 108 can be configured as or include a base station of an EIA-TIA-95A network, a CDMA2000 network, or a GSM network. A radio network, including a base station and UE device within one or those networks can operate according to a CDMA standard, such as CDMA2000-1× or CDMA2000-1×-EVDO. In accordance with one or more example embodiments, base station 104 and base station 106 and other base station(s) (not shown) in system 100 can also be configured as base station 108 described in this third example. The base station of those embodiments can operate using any one of two or more frequency bands used by system 100.

BSC 110 controls or is configured to control one or more base stations. BSC 110 can be configured as or include an RNC. Some or all of the functions carried out by BSC 110 can be carried out by or within core network 112 such that a base station can connect directly to core network 112.

FIG. 1 shows a single UE device. One or more UE devices can operate within each coverage area provided by each base station within system 100. Each UE device operating within system 100 can be configured like UE device 102, but is not so limited. The functions and methods described herein with respect to UE device 102 can also be performed by or for one or more other UE devices operating within system 100.

UE device 102 can be served by a base station within system 100. In one respect, UE device 102 can be a mobile UE device. A mobile UE device can be moved from a first coverage area to a second coverage area, operate with a first base station while located in the first coverage area and while moving towards the second coverage area, and switch to operate with a second base station after entering the second coverage area. A base station with which UE device 102 is operating can be referred to as a serving base station. A serving base station can cause registration of the UE device in a home location register so that communications, such as a voice call or electronic message can be routed to UE device 102. A base station that is available for a UE device to handover to can be referred to as a target base station. A UE device operating with a base station can include, but is not limited to, the base station idling on the base station or the UE device being connected to the base station.

In another respect, a UE device can be a stationary UE device that operates at a fixed location (e.g., a location within a house or office building). The fixed location may include, but is not limited to, a location at which the stationary UE device can receive electrical power to operate the UE device from a power outlet within a wall of the house or office building.

UE device 102 can be configured as or include any of a variety of wireless communication devices. For example, UE device 102 can be configured as or include a mobile phone, a cellular phone, a feature phone, a smart phone, a personal digital assistant, a tablet computing device, or a laptop or desktop personal computer including a wireless modem, such as a 3G/4G USB modem 250U sold by Sprint®.

UE device 102 can be configured as or include a multi-band UE device, such as a dual-band UE device or a tri-band UE device. A dual-band UE device can include transmitters for transmitting RF signals within two distinct frequency bands, and can include receivers for receiving RF signals within two distinct frequency bands. One or more of the frequency bands used by a transmitter of a dual-band UE device can be the same as a frequency band used by the receiver of the dual-band UE device. One or more of the frequency bands used by a transmitter of a dual-band UE device can be different than a frequency band used by the receiver of the dual-band UE device. As an example, the frequency bands used by a dual-band UE device can be the 800 megahertz (MHz) frequency band and the 1.9 Gigahertz (GHz) frequency band. Other examples of frequency bands used by a dual-band UE device are also possible.

A tri-band UE device can include transmitters for transmitting RF signals within three distinct frequency bands, and can include receivers for receiving RF signals within three distinct frequency bands. One or more of the frequency bands used by a transmitter of a tri-band UE device can be the same as a frequency band used by the receiver of the tri-band UE device. One or more of the frequency bands used by a transmitter of a tri-band UE device can be different than a frequency band used by the receiver of the tri-band UE device. As an example, the frequency bands used by a tri-band UE device can be the 800 MHz frequency band, the 1.9 GHz frequency band, and the 2.5 GHz frequency band. Other examples of frequency bands used by a tri-band UE device are also possible.

The example embodiments are also applicable to multi-band UE devices that are operable within more than three frequency bands. For instance, the example embodiments are applicable to a quad-band UE device.

Core network 112 can include a network of core network elements that provides network services to a UE device operating within communication system 100. A service provider, such as the Sprint Corporation, Overland Park, Kans., can operate core network 112 or a portion thereof. The core network elements can include, but are not limited to, a gateway, a processor, a computer-readable medium, a switch, or a communication link connecting two or more other core network elements. The components of core network 112, as well as the components that connect a UE device to core network 112, can perform various services for the UE device that connects to core network 112. For example, a gateway can connect core network 112, or a device within or accessing core network 112, to external network 114. Core network 112 can connect to a UE device, such as UE device 102, using an e-Node-B, an RNC, or a BSC of a radio network and, in turn, connect that UE device to external network 114 or to another device within or connected to external network 114.

External network 114 can include one or more external networks that are connected to or are connectable to core network 112 or to another portion of communication system 100. UE device 102 can carry out a communication session with a device within external network 114 or another device that can connect to external network 114. As an example, external network 114 can include the public switched telephone network (PSTN), or another core network (such as another core network operated by a service provider of core network 112 or by another service provider). As another example, external network 114 can include the Internet or a portion of the Internet accessible by core network 112. As yet another example, external network 114 can include an Internet Protocol Multimedia Subsystem (IMS) network. Other examples of external network 114 are also possible.

Figure 2:
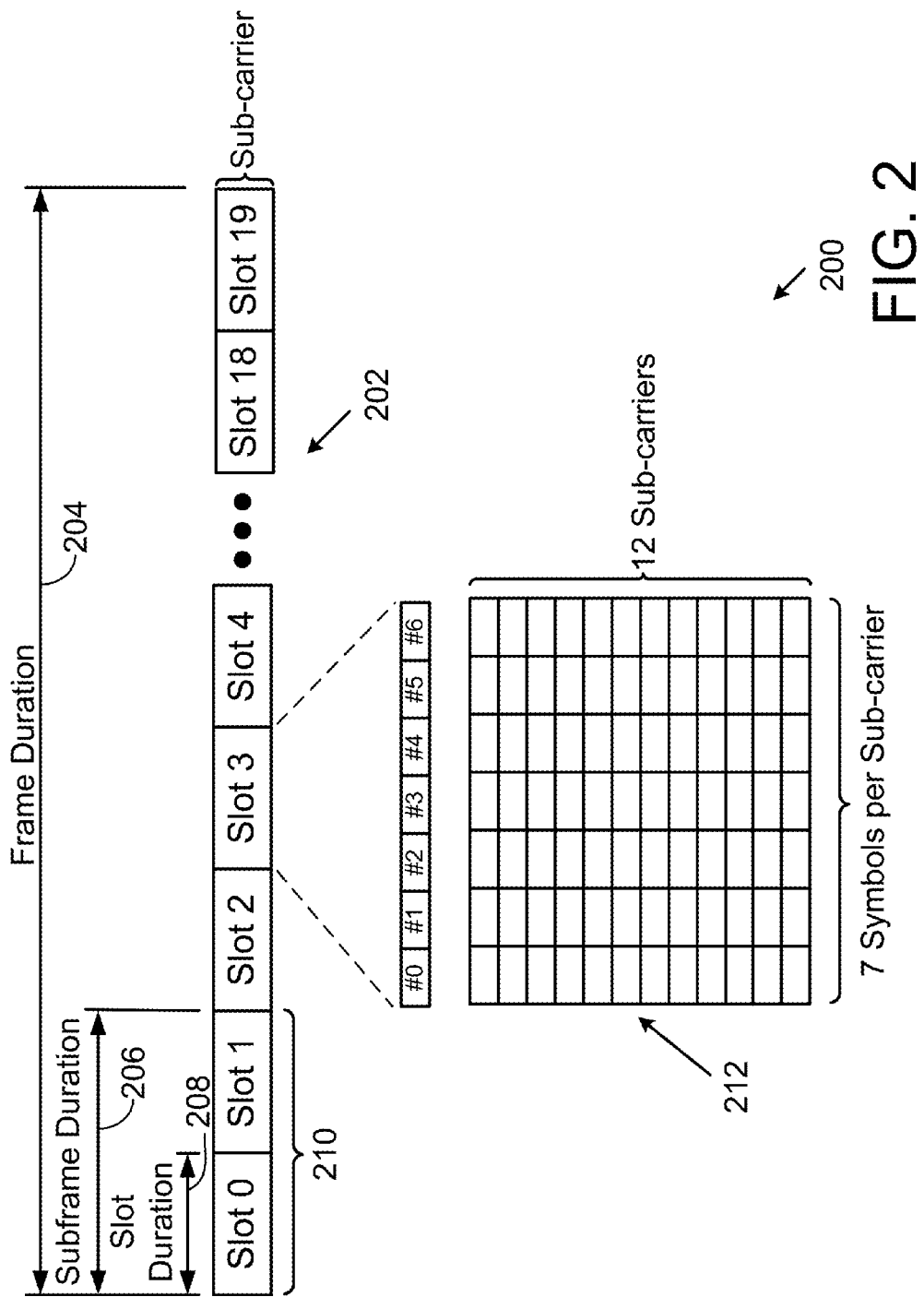
FIG. 2 is a simplified block diagram of showing aspects of a frame for communicating data within the communication system shown in FIG. 1.

Next, FIG. 2 is a diagram 200 showing aspects of a frame 202 for communicating data within communication system 100 or some other system or network. Frame 202 can be carried by one of a plurality of subcarriers within a frequency band used by a base station or UE device. An uplink frame (e.g., a frame transmitted over or carried on an uplink channel) can be configured like frame 202, but is not so limited. A downlink frame (e.g., a frame transmitted over or carried on a downlink channel) can be configured like frame 202, but is not so limited. Frame 202 can be arranged in accordance with the LTE protocol using FDD or another protocol. A communication link carrying frame 202 can carry one or more other frames prior to, while, or after carrying frame 202.

Frame 202 can include 20 slots (e.g., slots numbered 0 to 19) that occur over a frame duration 204 (e.g., a time duration of 10 milliseconds (ms)). Two adjacent slots within frame 202 can be referred to as a subframe. A subframe can occur over a subframe duration 206 (e.g., a subframe duration of 1 ms). As an example, slot 0 and slot 1 can be referred to as subframe 210. Each slot occurs over a slot duration (e.g., slot 0 occurs over slot duration 208). As an example, slot duration 208 can be 0.5 ms. A duration of a slot or subframe can define a transmission time interval for a base station, UE device, or network.

Each slot of frame 202 can include a quantity of symbols, such as three, six, or seven symbols. As shown in FIG. 2, slot 3 includes seven symbols (e.g., symbols numbed 0 to 6). The symbols can be encoded using any of a variety of modulation schemes such as, but not limited to, a quadrature phase shift keying (QPSK) scheme or a quadrature amplitude modulation (QAM) scheme, such as 16QAM or 64QAM. The symbols can represent the data to be communicated using system 100.

FIG. 2 also depicts an example resource block 212 including 84 resource elements carried using 12 subcarriers during a single slot duration. The resource elements (represented by one of the 84 small rectangles) can include the symbols modulated onto the subcarriers. A resource block could include a different number of resource elements.

Figure 3:
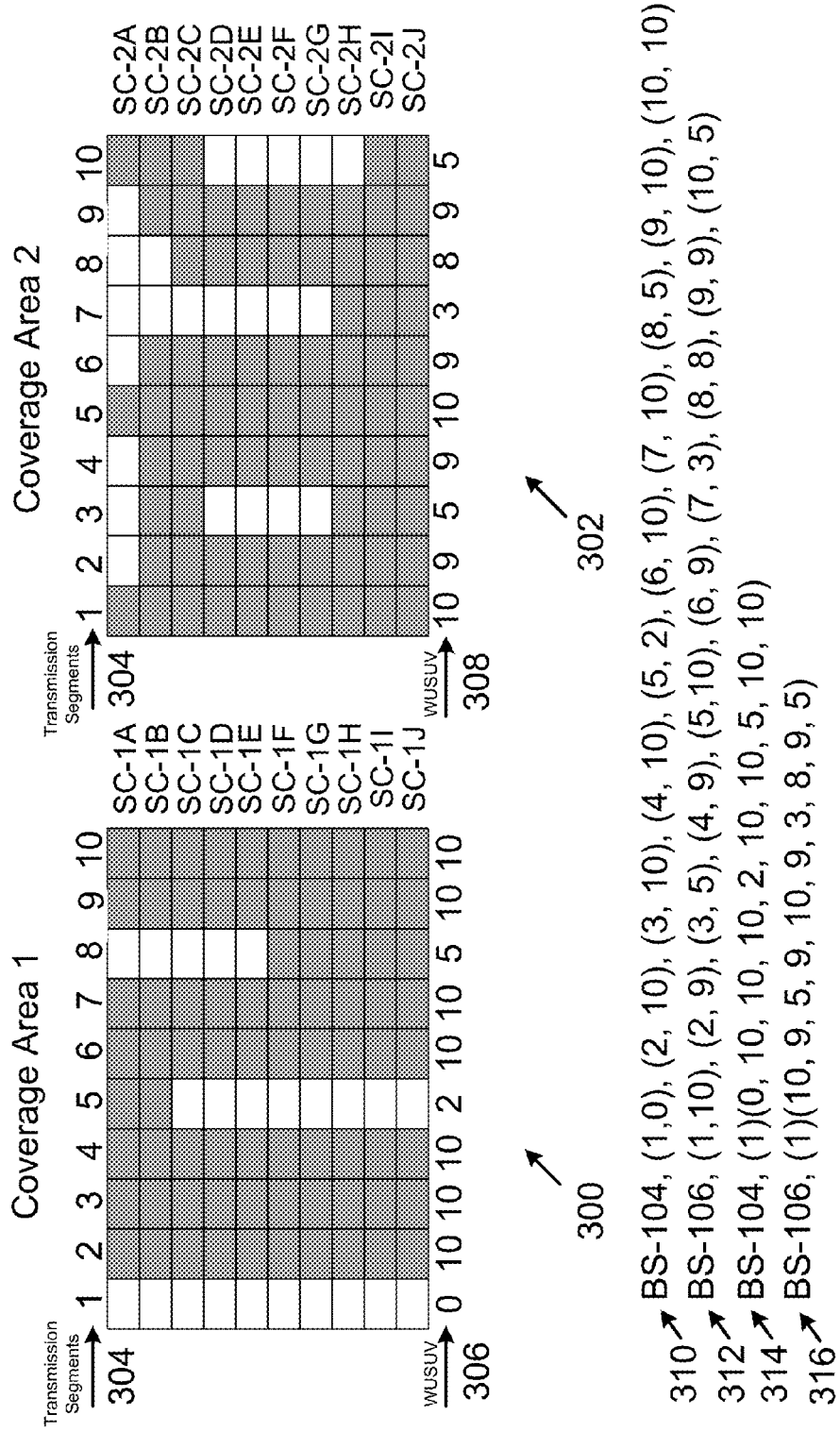
FIG. 3 is a diagram representing use and non-use of RF resources provided within two coverage areas.

Next, FIG. 3 illustrates a diagram 300 representing use and non-use (i.e., availability) of RF uplink resources for a first coverage area (i.e., coverage area 1) provided by a first base station and a diagram 302 representing use and non-use of RF uplink resources for a second coverage area (i.e., coverage area 2) provided by a second base station or by another coverage area (e.g., another sector) of the first base station. For purposes of describing FIG. 3, base station 104 will be the first base station and base station 106 will be the second base station. The use of RF uplink resources for a coverage area can be referred to as a load of that coverage area.

Each row in diagram 300 can represent a set of distinct sub-carriers of base station 104. Those sets of sub-carriers are identified as SC-1A through SC-1J, where the "SC" represents sub-carriers, the "1" represents coverage area 1, and the letters "A" through "J" represent a distinct set of sub-carriers within coverage area 1. Each row in diagram 302 represents a set of distinct sub-carriers of base station 106. Those sets of sub-carriers are identified as SC-2A through SC-2J, where the "SC" represents sub-carriers, the "2" represents coverage area 2, and the letters "A" through "J" represent a distinct set of sub-carriers within coverage area 2.

Each column in diagrams 300 and 302 represents one transmission segment for base stations 104 and 106, respectively. The transmission segments 304 identified for coverage areas 1 and 2 in FIG. 3 are transmission segments 1 through 10. In accordance with the example embodiments, each transmission segment can correspond to a subframe, such as subframe 210, but each transmission segment is not so limited. For instance, each transmission segment could correspond to a frame, such as frame 202, a slot, such as slot 0 of subframe 210, or a symbol, such as symbol #0 of slot 3 of frame 202.

Diagram 300 and diagram 302 each include one hundred rectangles, some of which are white and some of which are gray. For purposes of this description, the gray rectangles represent RF resources used or in use and the white rectangles represent RF resources not used or not in use. As an example, each rectangle can represent a resource block 212 of RF uplink resources such that each column represents one slot of a subframe. As another example, each rectangle can represent two resource blocks occurring over two consecutive slots of a subframe. In accordance with either of those examples or some other example, diagram 300 shows that seventy-seven of the RF resources of base station 104 were used and twenty-three RF resources of base station 104 were not used (i.e., available), and diagram 302 shows that seventy-seven RF resources of base station 106 were used and twenty-three RF uplink resources of base station 106 were not used. In accordance with the example embodiments, the RF resources represented by the rectangles in diagrams 300 and 302 can be RF uplink resources, such as one or more RF uplink resource blocks. The numbers at the bottom of diagrams 300 and 302 indicate the number of gray rectangles in each column (i.e., the number of RF resources used). Those numbers also represent the number of WUSUV for each column. WUSUV 306 correspond to coverage area 1 and WUSUV 308 correspond to coverage area 2.

In accordance with the example embodiments in which each transmission segment shown in FIG. 3 is a sub-frame, assuming each sub-frame has a time duration of 1 ms, then diagrams 300 and 302 each represent a time duration of 10 ms. Diagrams 300 and 302 are merely representative of a portion of the transmission segments that would typically occur during operation of base stations 104 and 106 and UE device 102 and other UE devices. Separate diagrams could be used to represent the additional transmission segments, although the separate diagrams may have some other combination of rectangles shaded to show different use patterns of the RF resources (e.g., sub-carriers) during those additional transmission segments.

WUSUV, such as WUSUV 306 and 308, can be communicated throughout system 100 using messages including message data arranged in any of a variety of configurations. For example, the WUSVU could be communicated by a message with message data including the WUSUV and a corresponding transmission segment identifier for each WUSUV, such as message data 310 and 312. As another example, the WUSVU could be communicated by a message with message data including the WUSUV and a single transmission segment identifier, such as message data 314 and 316. In the latter example, the single transmission identifier can be the earliest transmission segment identifier for the WUSUV, but is not so limited.

Figure 4:
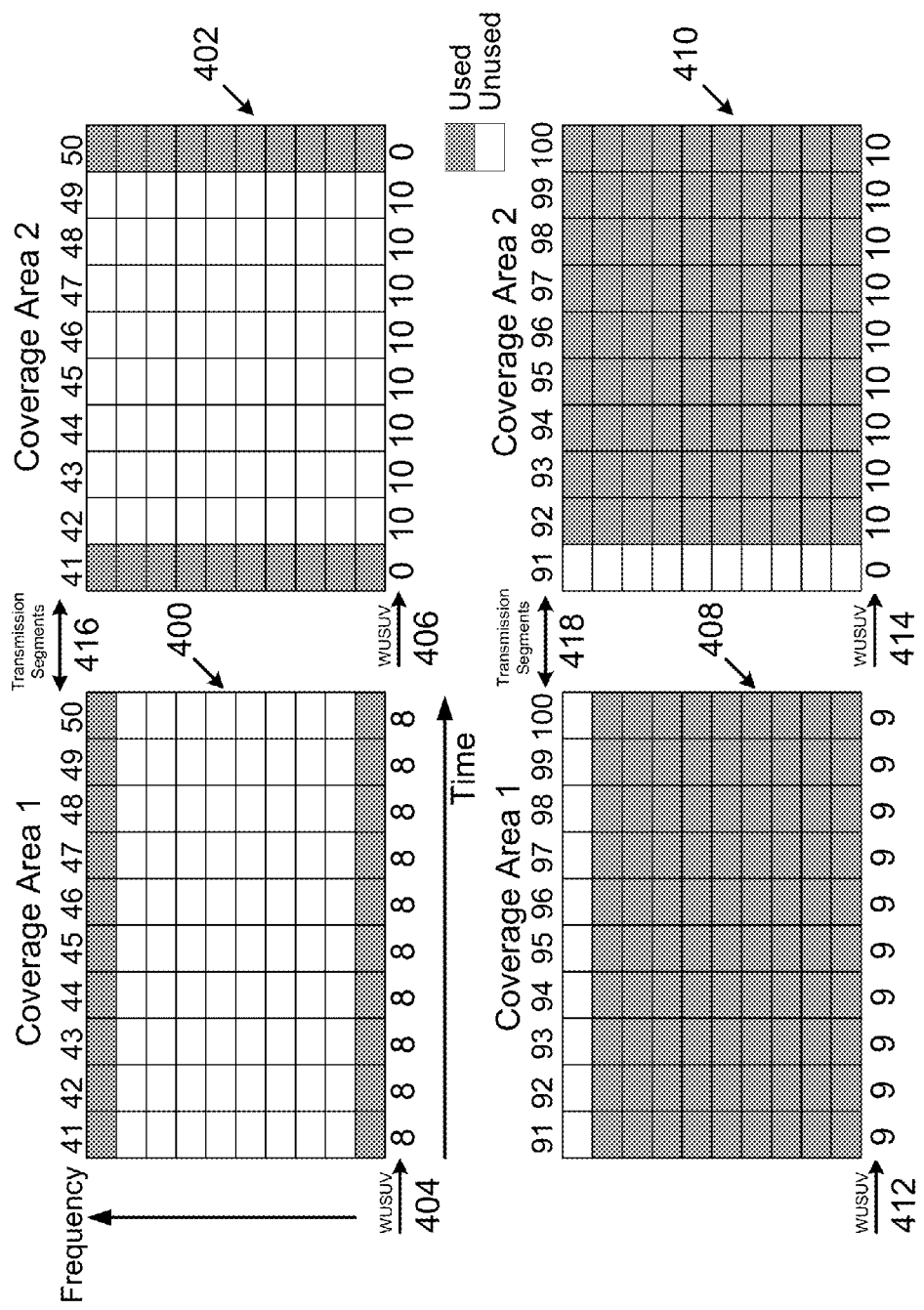
FIG. 4 is a diagram representing use and non-use of RF resources provided within two coverage areas.

Next, FIG. 4 illustrates diagrams 400 and 408 representing use and non-use of RF resources (e.g., RF uplink resources) for coverage area 1 provided by a first base station (e.g., base station 104) and diagrams 402 and 410 representing use and non-use of RF resources (e.g., RF uplink resources) for coverage area 2 provided by a second base station (e.g., base station 106) or by another coverage area of the first base station. Diagrams 400 and 402 pertain to transmission segments 41 through 50, whereas diagrams 408 and 410 pertain to transmission segments 91 through 100. WUSUV 404, 406, 412, and 414 are shown for diagrams 400, 402, 408, and 410, respectively.

Unlike the downlink in which transmission power is typically not an issue and a pattern of using downlink RF resources may not impact user throughput, for the uplink, transmission power is an important consideration for UE devices, especially UE devices operating near the edge of a cell. A use pattern of the RF resources available to the UE device can impact performance of the UE device. Therefore, considering the use pattern when selecting or assigning RF resources may be beneficial for improving performance of a UE device operating near the edge of a cell. The load measurements described herein can be indicative of a use pattern and thus considered when selecting or assigning RF resources. The load measurements can also be used when selecting or assigning RF resources for a UE device operating away from the edge of a cell as the load measurements are not limited to selecting or assigning RF resources to UE devices operating near (i.e., within) the edge of the cell or coverage area.

The rows and columns of diagrams 400 and 402 represent the same information as the rows and columns of diagrams 300 and 302, respectively, although different combinations of WUSUV are shown in diagrams 300, 302, 400 and 402 and different transmission segments are identified. Similarly, the rows and columns of diagrams 408 and 410 represent the same information as the rows and columns of diagrams 300 and 302, respectively, although different combinations of WUSUV are shown in diagrams 300, 302, 408 and 410 and different transmission segments are identified. The frequency and time reference lines shown with respect to diagram 400 are applicable to the axis of diagrams 300, 302, 402, 408 and 410.

Diagrams 400 and 402 represent an equivalent average use (i.e., 20 percent) of RF resources over the time and frequency represented by those diagrams, but with a different pattern of use. Each of the 100 rectangles in diagrams 400 and 402 can represent one resource block. In one respect, a pattern of use such as the pattern of use shown in diagram 400 would allow for assigning at least one additional resource block in each of the ten transmission segments, but the pattern of use in diagram 402 would allow for assigning at least one additional resource block in only eight of the ten transmission segments. In another respect, a pattern of use, such as the pattern of use shown in diagram 402 would allow for assigning ten additional resource blocks during a given transmission segment in eight of the ten transmission segments, but the pattern of use in diagram 400 would not allow for assigning ten additional resource blocks in any transmission segment.

Diagrams 408 and 410 represent an equivalent average use (i.e., 90 percent) of RF resources over the time and frequency represented by those diagrams, but with a different pattern of use. Each of the 100 rectangles in diagrams 408 and 410 can represent one resource block. In one respect, a pattern of use such as the pattern of use shown in diagram 408 would allow for assigning one additional resource block in each of the ten transmission segments, but the pattern of use in diagram 402 would allow for assigning one additional resource block in only one of the ten transmission segments. In another respect, a pattern of use such as the pattern of use shown in diagram 408 would not allow for assigning ten additional resource blocks in any of the ten transmission segment, but the pattern of use in diagram 410 would allow for assigning ten additional resource blocks in one transmission segment.

The patterns of using RF resources during prior transmission segments can be indicative of patterns of using RF resources during future transmission segments and can be compared to application requirements for basing a decision to select or assign RF resources.

A pattern of use shown in diagram 408 can be desirable for UE devices operating in the edge of a coverage area as those UE devices may have less uplink transmission power headroom. The pattern of use shown in diagram 408 can compensate for low data rate and low instantaneous transmission power by providing continuous transmission opportunities.

A pattern of use shown in diagram 410 can be desirable for UE devices close to the base station (in a non-edge portion away from the edge of a coverage area provided by that base station) as those UE devices may have a greater uplink transmission power headroom. The pattern of use shown in diagram 410 can allow UE devices to quickly transmit their data packets in short busts (e.g., over fewer transmission segments).

Figure 5:
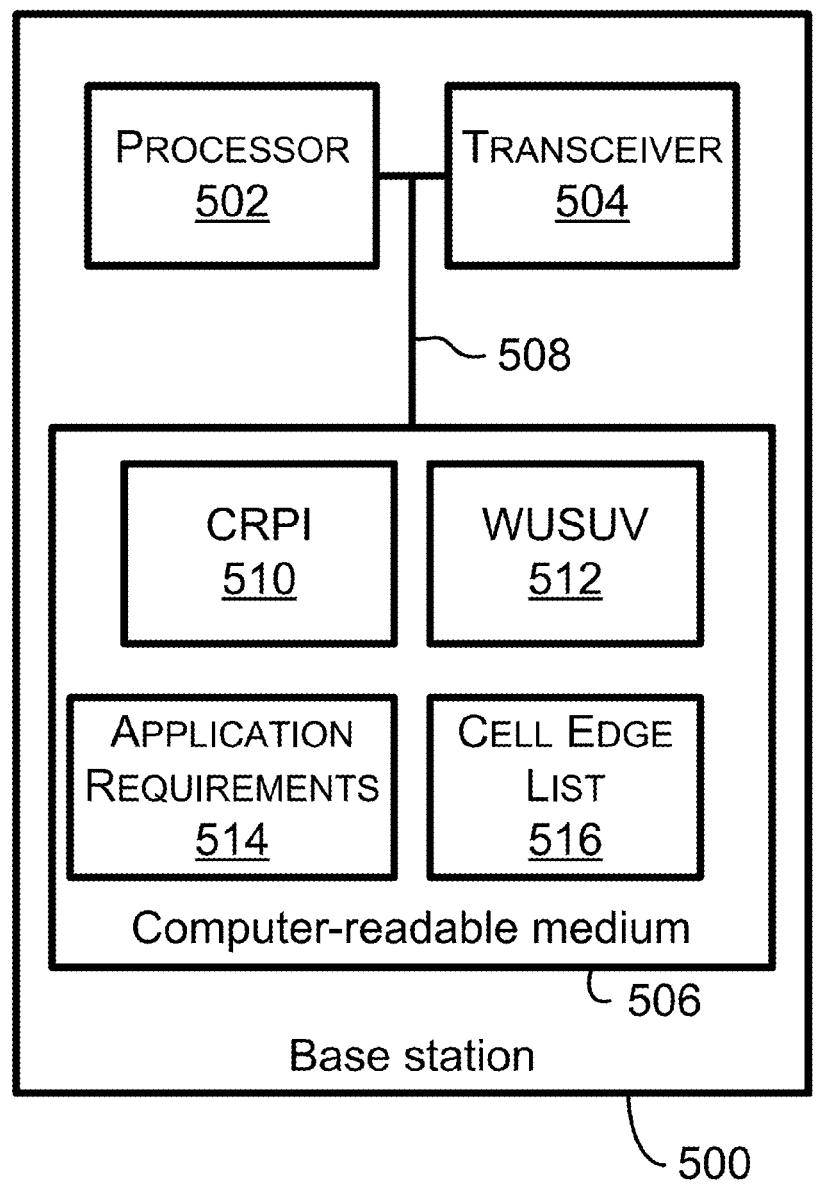
FIG. 5 is a simplified block diagram of a base station in accordance with the example embodiments described herein.

Next, FIG. 5 is a block diagram of a base station 500 in accordance with one or more of the example embodiments described herein. Base station 500 includes a processor 502, a transceiver 504, and a computer-readable medium 506, all of which can be linked together via a system bus, network, or other connection mechanism 508. One or more base stations of communication system 100, such as one or more of base stations 104, 106, and 108, can include the same elements as base station 500. Accordingly, base stations 104, 106, 108 and 500 can use the OFDMA protocol. A base station that uses the OFDMA protocol can include, but not limited to, an eNode-B, a Wi-MAX base station, or an MBWA base station.

A processor, such as processor 502 or any other processor disclosed herein, can include one or more general purpose processors (e.g., INTEL single core microprocessors or INTEL multicore microprocessors) or one or more special purpose processors (e.g., application specific integrated circuits (ASICs) or digital signal processors (DSPs)). Each processor disclosed herein can execute computer-readable program instructions (CRPI) stored within a computer-readable medium. For example, processor 502 can execute CRPI 510 stored within computer-readable medium 506.

Transceiver 504 can include a transmitter (e.g., one or more transmitters) and a receiver (e.g., one or more receivers). A transmitter of transceiver 504 can include a first transmitter to wirelessly transmit data over an RF downlink of a communication link of system 100 (e.g., one of communication links 116, 118, and 120). As an example, the transmitter of transceiver 504 can transmit WUSUV to one more UE devices or one or more base stations using a MIB, a SIB, or some other message or signal carrying the WUSUV (e.g., WUSUV 310, 312, 314, or 316). A transmitter of transceiver 504 can include a second transmitter to transmit data to other elements of system 100, such as another base station or core network 112. The second transmitter can transmit the data over a wired or wireless communication link. One or more of the first and second transmitters can be configured as or include a multiple-input and multiple-output (MIMO) transmitter, a diversity transmitter, or a multi-channel transmitter, but are not so limited. A transmitter of transceiver 504 can include one or more transmitting antennas.

A receiver of transceiver 504 can include a first receiver to receive data wirelessly transmitted over an RF uplink of a communication link of system 100 (e.g., one of communication links 116, 118, and 120). A receiver of transceiver 504 can include a second receiver to receive data from other elements of system 100, such as another base station or core network 112. As an example, the receiver of transceiver 504 can receive WUSUV transmitted by another base station using a MIB, a SIB, or some other message or signal carrying the WUSUV. The second receiver can receive the data over a wired or wireless communication link. One or more of the first and second receivers can be configured as or include a MIMO receiver, a diversity receiver, or a multi-channel receiver, but are not so limited. A receiver of transceiver 504 can include one or more receiving antennas.

A computer-readable medium, such as computer-readable medium 506 or any other computer-readable medium disclosed herein, can include a non-transitory computer-readable medium readable by a processor. A computer-readable medium can comprise volatile and/or non-volatile storage components, such as optical, magnetic, organic or other memory or disc storage, which can be integrated in whole or in part with a processor. A computer-readable medium, such as computer-readable medium 506, or a portion thereof, can also or alternatively be provided as a separate non-transitory machine readable medium distinct from a processor, such as processor 502. A computer-readable medium can be referred to by other terms such as, but not limited to, a "computer-readable storage medium," a "data storage device," a "memory device," or a "memory."

Additionally or alternatively, computer-readable medium 506 can comprise a transitory computer-readable medium. The transitory computer-readable medium can include, but is not limited to, a communications medium such as a digital or analog communications medium (e.g., a fiber optic cable, a waveguide, a wired communication link, or a wireless communication link).

Computer-readable medium 506 can include WUSUV 512. As an example, WUSUV 512 can include a number of WUSUV, where the number of WUSUV equals 20, 50, 100, or 200 WUSUV or some other number of WUSUV. Computer-readable medium 506 can store WUSUV 512 using a first-stored, first-overwritten, process, but is not so limited.

Any WUSUV can include or correspond to a transmission segment identifier. A transmission segment identifier for one or more WUSUV can be implied by an order in which the WUSUV is stored by a computer-readable medium (e.g., a sequential order of data addresses within computer-readable medium 506 can indicate the order in which the WUSUV were stored). As an example, a transmission segment identifier can identify a time the use or non-use of the uplink RF resource occurred. The time can be specified by a coordinated universal time (UTC), but is not so limited. As another example, a transmission segment identifier can identify a sequence identifier, such as a sequence number (as shown in FIG. 3 and FIG. 4) indicating when a WUSUV was determined or received. Numbers 1 to 10 in FIG. 3 and numbers 41 to 50 and 91 to 100 are examples of the sequence numbers.

A processor (e.g., processor 502 or processor 602 (shown in FIG. 6)) can use the transmission segment identifier(s) to determine a subset (e.g., one or more subsets) of WUSUV that pertain to a particular base station for a particular time period (i.e., a window) (e.g., a subset of WUSUV pertaining to base station 104 and a first time period or a subset of WUSUV pertaining to base station 106 and to the first time period). The time period can indicate when the WUSUV within that subset was received or determined. The time period for each subset of WUSUV can be equal to the time of one frame duration, but is not so limited. The time period can equal a number of transmission segments such as, but not limited to, ten transmission segments.

If the particular base station provides a single coverage area, the WUSUV that pertain to the particular base station can also pertain to the RF uplink of that coverage area. If the particular base station provides more than one coverage area, the WUSUV that pertain to the particular base station can also pertain to a particular coverage area of the particular base station and an RF uplink of the particular coverage area.

A subset of WUSUV can include the latest (e.g., the most recently received or determined) WUSUV that pertain to a particular base station or RF uplink of the particular base station. The latest WUSUV may provide a best prediction for future use of the RF uplink to which the WUSUV pertain. As an example, a processor can determine a current time and a number of the latest WUSUV corresponding to transmission segment identifiers that indicate times immediately prior to the current time. As another example, a processor can determine a transmission segment identifier that indicates the latest sequence identifier assigned to a WUSUV and a number of the latest WUSUV corresponding to the latest sequence identifier.

Turning to the CRPI, CRPI 510, in general, can include program instructions, that when executed by processor 502, cause a set of functions to be performed. As an example, the set of functions performed by execution of CRPI 510 can include any function disclosed herein as being performed by processor 502, transceiver 504, computer-readable medium 506, or system bus, network, or other connection mechanism 508. As another example, the set of functions performed by execution of CRPI 510 can include any function performed by a base station. As another example, the set of functions performed by execution of CRPI 510 can include one or more of the functions of the set 700 and the set 800 described below with respect to FIG. 7 and FIG. 8, respectively. Other examples of the set of functions performed by execution of CRPI 510 are also possible.

As another example, CPRI 510 can include program instructions to determine a count of WUSUV for a transmission segment. Those program instructions can be referred to as "count WUSUV CPRI." Execution of the count WUSUV CPRI can include a processor determining how many resource blocks were assigned by base station 500 for a transmission segment. Additionally or alternatively, execution of the count WUSUV CPRI can include a processor determining how many resource blocks carried data to the base station during the transmission segment. Execution of the count WUSUV CRPI can lead to determining WUSUV 306, 308, 404, 406, 412, and 414.

As another example, CRPI 510 can include program instructions to determine multiple WUSUV from among WUSUV 512. Those program instructions can be referred to as "WUSUV determination CRPI." The quantity of WUSUV determined by execution of the WUSUV determination CRPI can equal a predetermined number of WUSUV, such as $P_{WUSUV}$, where $P_{WUSUV}=10$ or some other number of WUSUV greater than 1. As an example, when $P_{WUSUV}=10$, the multiple WUSUV can include WUSUV 306 corresponding to transmission segments 304. The WUSUV determination CPRI can be configured such that use values correspond to a transmission segment other than a subframe, such as a frame or slot.

As another example, CRPI 510 can include program instructions to store the determined WUSUV within WUSUV 512. Those program instructions can be referred to as "WUSUV storage CRPI."

As another example, CRPI 510 can include program instructions to monitor the peak RF usage (e.g., uplink or downlink RF usage) at every desired transmission segment (e.g., every subframe) or multiple transmission segments (over a time period or window) to determine the use values (e.g., WUSUV) and compare the use values determined for different cells or coverage areas. Those program instructions can be referred to as "peak monitoring CRPI."

As another example, CRPI 510 can include program instructions to select a cell, a coverage area, or a base station providing the cell or coverage area for UE device 102. Those program instructions can be referred to as "base station selection CRPI." The base station selection CRPI can be executed for UE devices operating at or near an edge of a cell or coverage area, as well as other UE devices operating at other locations. The base station selection CRPI can executed to perform call admission control for UE device 102, mobility of UE device 102, load balancing of the cell or coverage area, or for another reason.

As yet another example, CRPI 510 can include program instructions to transmit WUSUV data, transmission segment identifier(s), or base station selections to another device (e.g., another base station or to a UE device) as described herein. Those program instructions can be referred to as "transmission CRPI." Execution of the transmission CRPI can include generating a message including the message to be transmitted, providing the message to a transmitter, and transmitting the message. Execution of the transmission CRPI can include receiving a message with the WUSUV data, transmission segment identifier(s), or base station selections from another device.

The base station selection CRPI can be configured for selecting the cell, coverage area or base station based on, at least in part, a load of the base station or a frequency (e.g., a number of occurrences) of peak utilization of RF resources in the cell or coverage area during a time period. Referring to FIG. 3, executing the base station selection CRPI to select between base stations 104 and 106 based on WUSUV determined for transmission segments 304 could lead to processor 502 determining the load for each of the base stations was seventy-seven percent and a number of peak utilization values (i.e., seven WUSUV equal to 10 for base station 104 and two WUSUV equal to 10 for base station 106). With an equal load and unequal peak WUSUV, the base station with the fewer peak WUSUV can be selected. With an equal load and equal peak WUSUV, execution of the base station selection CRPI can cause processor 502 to determine and select which base station has fewer next highest peak WUSUV (e.g., 9, then 8 if both base stations have the same number of 9 WUSUV, etc.). The base station selection can also be based on a greatest number of transmission segments with available resource blocks for the time period or window.

FIG. 3 and FIG. 4 illustrate that the coverage areas 1 and 2 are equally loaded for transmission segments 304. Under many circumstances, the coverage areas provided by two or more base stations are not equally loaded. For instance, for another set of transmission segments (not shown), the load for coverage area 1 could be sixty-two percent (which could be illustrated by a diagram like diagram 300 with 100 rectangles in which 62 of the small rectangles are colored gray and 38 small rectangles are colored white) and the load for coverage area 2 could be seventy-four percent (which could be illustrated by a diagram like diagram 300 with 100 rectangles in which 74 of the small rectangles are colored gray and 26 small rectangles are colored white).

Execution of the base station selection CRPI can allow a processor to determine a difference between the base station loads and compare the base station load difference (BSLD) to a base station load threshold (BSLT). If the BSLD exceeds BSLT, execution of the base station selection CRPI can cause selection of the base station with a smaller load without consideration to the number of peak WUSUV for each coverage area. If the BSLT exceeds the BSLD, execution of the base station selection CRPI can cause selection of the base station based on the number of peak WUSUV for each coverage area, as described above, without consideration of difference in base station loads (if any). Computer-readable medium 506 can store the BSLT.

Computer-readable medium 506 can also include application requirements 514. Application requirements 514 can include an identifier of UE device 102 (or one or more other UE devices) and an identifier of an application executing on UE device 102 (or the one or more other UE devices) or an application requirement corresponding to the application executing on UE device 102 (or the one or more other UE devices). For example, the application requirements may be defined as a number of uplink resource blocks (RBs) needed to maintain a required data rate for the application executing on UE device 102.

Computer-readable medium 506 can also include a cell edge list 516 including data that indicates which UE devices operating within the coverage area provided by base station 500 are within an area defined as a cell edge for the coverage area provided by base station 500. Processor 502 can execute CRPI 510 to determine a location of each UE device connected to or camping on base station 500, and to compare the determined location to the area defined as the cell edge so as to determine whether the UE device is operating within the cell edge area. Processor 502 can modify cell edge list 516 to include any UE device recently determined to be operating within the cell edge and to remove any UE device listed in the cell edge list 516, but no longer operating within the cell edge.

Figure 6:
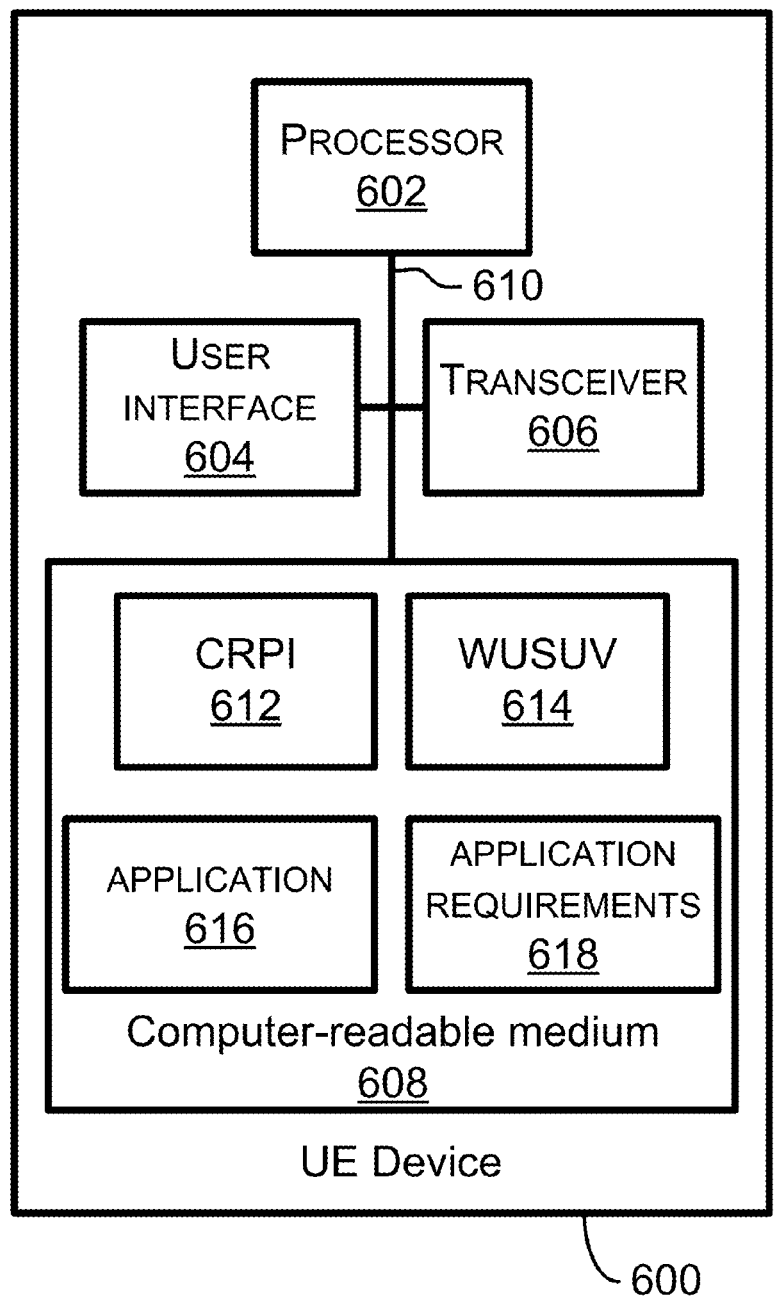
FIG. 6 is a simplified block diagram of a UE device in accordance with the example embodiments described herein.

Next, FIG. 6 is a block diagram of a UE device 600 in accordance with one or more of the example embodiments disclosed herein. UE device 600 includes a processor 602, a user interface 604, a transceiver 606, and a computer-readable medium 608, all of which can be linked together via a system bus, network, or other connection mechanism 610. One or more UE devices operable within communication system 100, such as UE device 102, can include any of the elements of UE device 600. Processor 602 can execute CRPI 612 stored within computer-readable medium 608.

User interface 604 can include an input element for a user to enter data (e.g., a user selection) into UE device 600. The input element of user interface 604 can include, but is not limited to, one or more switches (e.g., keys of a keypad) to input. The input element can be used to enter a telephone number to be dialed or a uniform resource locator (URL) of a website on the World Wide Web. The input element can include an element to initiate dialing of the telephone number or to initiate a browser to request data from the URL. The input element can include an application selection element to select and initiate execution of an application stored within application 616. The input element can include a microphone that converts sounds into electrical signals for transmission during a phone call. Other examples of the input element portion of user interface 604 are also possible.

User interface 604 can include an output element for outputting data to a user. The output element of user interface 604 can include, but is not limited to, a display to output data visually and a loudspeaker to output data audibly. The display can include a touch screen display that also functions as input element of user interface 604. The output element can output data generated by execution of an application stored within application 616.

Transceiver 606 can include a transmitter (e.g., one or more transmitters) and a receiver (e.g., one or more receivers). A transmitter of transceiver 606 can include a transmitter to wirelessly transmit data over an RF uplink of a communication link of system 100 (e.g., one of communication links 116, 118, and 120). A transmitter of transceiver 606 can be configured as or include a MIMO transmitter, a diversity transmitter, or a multi-channel transmitter, but is not so limited. A transmitter of transceiver 606 can include one or more transmitting antennas.

A receiver of transceiver 606 can include a receiver to receive data wirelessly transmitted over an RF downlink of a communication link of system 100 (e.g., one of communication links 116, 118, and 120). A receiver of transceiver 606 can include one or more receiving antennas. As an example, the receiver of transceiver 606 can receive, from a base station, WUSUV or a MIB, a SIB, or some other message or signal carrying the WUSUV. A receiver of transceiver 606 can be configured as or include a MIMO receiver, a diversity receiver, or a multi-channel receiver, but is not so limited. A receiver of transceiver 606 can include one or more receiving antennas.

Computer-readable medium 608 can include CRPI 612, WUSUV 614, application 616, and application requirements 618. WUSUV 614 can include a number of WUSUV, where the number of WUSUV equals 20, 50, 100, or 200 WUSUV or some other number of WUSUV. Computer-readable medium 608 can store WUSUV 614 using a first-stored, first-overwritten, process, but is not so limited. Similar to WUSUV 512, one or more WUSUV of WUSUV 614 can include or correspond to a transmission segment identifier.

Application 616 (i.e., one or more applications) can include an application to carry out any of a variety of features, such as an application for browsing the Internet, an application for viewing video content streaming to UE device 600 over a communication link, or an application for playing audio content streaming to UE device 600 over the communication link. An application stored within application 616 can be downloaded from an application store, such as the GOOGLE PLAY® or ITUNES STORE®.

Application requirements 618 can indicate an amount of RF resources required to execute an application within application 616. As an example, an application may require ten RF uplink resource blocks during a given time period. Other applications may require a different amount of RF uplink resource blocks or a different time period for ten RF uplink resource blocks. Application requirements 618 can be included within application 616.

In general, CRPI 612 can include program instructions, that when executed by processor 602, cause a set of functions to be performed. As an example, the set of functions performed by execution of CRPI 612 can include any function disclosed herein as being performed by processor 602, user interface 604, transceiver 606, computer-readable medium 608, or system bus, network, or other connection mechanism 610. As another example, the set of functions performed by execution of CRPI 612 can include one or more of the functions of the sets 700, 800, and 900 described below with respect to FIGS. 7, 8, and 9, respectively. Other examples of the set of functions performed by execution of CRPI 612 are also possible.

CRPI 612 can include any of the count WUSUV CRPI, WUSUV determination CRPI, WUSUV storage CRPI, peak monitoring CRPI, base station selection CRPI, and transmission CRPI, as described above with respect to CRPI 510.

IV. Example Operation

Figure 7:
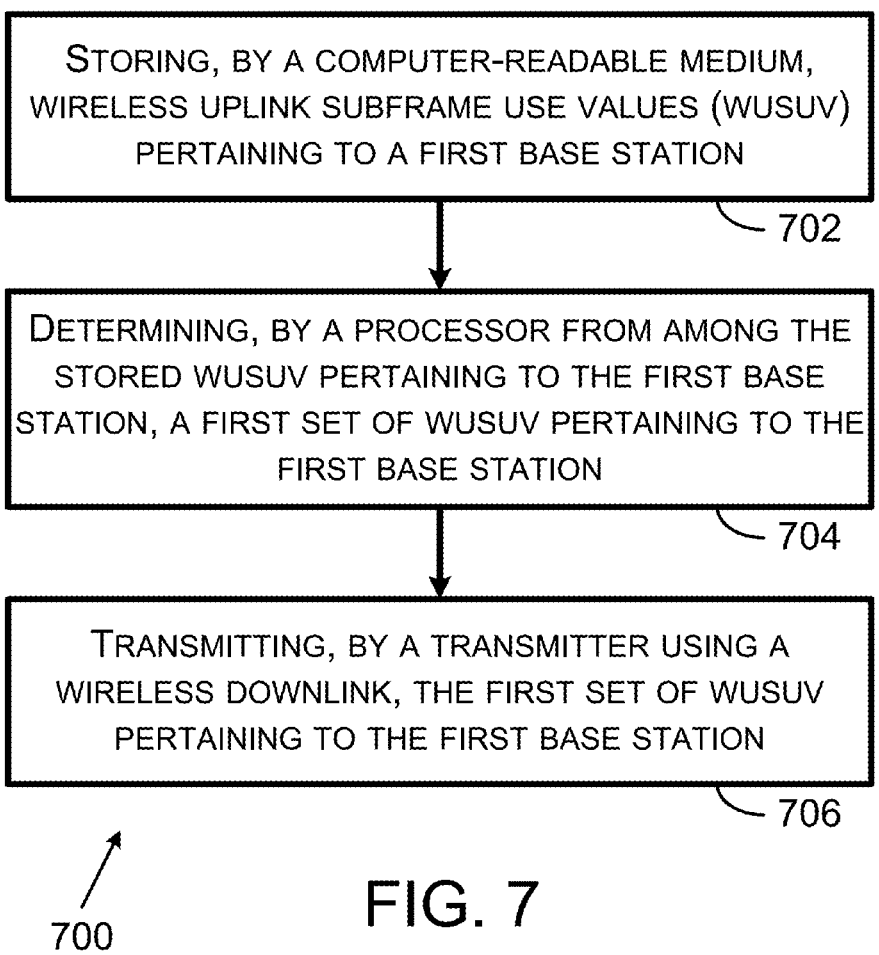
FIG. 7 is a flowchart depicting a set of functions that can be carried out in accordance with the example embodiments described herein.

FIG. 7 depicts a flowchart showing a set of functions (e.g., operations) 700 (or more simply, "the set 700") that can be carried out in accordance with the example embodiments disclosed herein. The functions of the set 700 are shown within blocks labeled with even integers between 702 and 706, inclusive. The functions of the set 700 refer to a first base station. With regard to the set 700, this description refers to the first base station as base station 104. The first base station (e.g., base station 104) can be configured like or include base station 500, but is not so limited. The performance of any function described herein with respect to a function of the set 700 can include a processor, such as processor 502 or 602, executing program instructions, such as CRPI 510 or 612, respectively, to perform at least a portion of the function.

Other function(s) disclosed in this description can be performed prior to, while, or after performing any one or more of the functions of the set 700. Those other function(s) can be performed in combination with or separately from any one or more of the functions of the set 700.

Block 702 includes storing, by a computer-readable medium, WUSUV pertaining to a first base station. Each of those WUSUV can represent use of a predetermined number of sub-carriers of base station 104 during a transmission segment. Computer-readable medium 506 can repeatedly store WUSUV for each successive transmission segment. Computer-readable medium 506 can store the WUSUV using a first-stored, first-overwritten, process, but is not so limited. Storing the WUSUV at block 702 can include computer-readable medium 506 storing WUSUV 512 and a transmission segment identifier corresponding to one or more of the WUSUV 512. Storing the WUSUV at block 702 can include computer-readable medium 506 storing WUSUV determined by a processor of base station 104 or WUSUV received by a receiver of base station 104.

Processor 502 can determine whether an uplink was used during a transmission segment in various ways. For example, processor 502 can determine whether an uplink was used during the transmission segment by determining whether transceiver 504 received data using that uplink during the transmission segment or by determining whether processor 502 received data from transceiver 504 during or for the transmission segment.

Although block 702 refers to use values for wireless uplink subframes, the use values could be stored for other wireless uplink transmission segments, such as wireless uplink frame use values or wireless uplink slot use values. In that way, the WUSUV referred to in blocks 702, 704 and 706, and the use of those terms in the description of those blocks, can be replaced with the use values of the other wireless uplink transmission segments.

Next, block 704 includes determining, by a processor (e.g., processor 502) from among the stored WUSUV pertaining to the first base station, a first set of WUSUV pertaining to the first base station. The first set of WUSUV can include the WUSUV 306 (i.e., 0, 10, 10, 10, 2, 10, 10, 5, 10, 10) for coverage area 1 in FIG. 3. Processor 502 can determine one or more other sets of WUSUV pertaining to base station 104. For example, processor 502 can determine a second set of WUSUV pertaining to base station 104 for transmission segments numbered 11 to 20 that occur after transmission segments 1 to 10, a third set of WUSUV pertaining to base station 104 for transmission segments numbered 21 to 30 that occur after transmission segments 11 to 20, and a fourth set of WUSUV pertaining to base station 104 for transmission segments numbered 31 to 40 that occur after transmission segments 21 to 30.

Processor 502 can generate a message (e.g., one or more messages) for transmitting the first set of WUSUV 306 to one or more devices remote from the first base station. The remote devices can include one or more UE devices and one or more base stations. The message can include each WUSUV of the first set of WUSUV 306. As an example, the message can include a master information block (MIB) arranged for wireless transmission to a UE device or a system information block (SIB) arranged for wireless transmission to a UE device, but the message is not so limited. As an example, the SIB can include a SIB-1 message that includes cell access related parameters or a SIB-2 message that includes common and shared channel configuration information. As another example, the message including each WUSUV of the first set of WUSUV 306 can include a message configured for transmission over a backhaul communication link (e.g., an X2 communication link) between base station 104 and another base station. A message including the first set of WUSUV or any other set of WUSUV can include at least one transmission segment identifier associated with at least one WUSUV with the set of WUSUV.

Next, block 706 includes transmitting, by a transmitter using a wireless downlink, the first set of WUSUV pertaining to the first base station. A transmitter of transceiver 504 can transmit the first set of WUSUV 306. Transmitting the first set of WUSUV can include the transmitter transmitting the message (e.g., a MIB message or a SIB message) including the first set of WUSUV 306. One or more UE devices operating in coverage area 1 of the first base station can receive the message including the first set of WUSUV. The transmitter can transmit other sets of WUSUV pertaining to the first base station such as, but not limited to, the second, third, and fourth sets of WUSUV pertaining to the first base station.

Transmission of the first set of WUSUV pertaining to the first base station can allow another device to receive that first set of WUSUV and use the received first set of WUSUV to determine whether a UE device should hand over to another base station or whether the UE device should camp on the first base station while operating in an idle mode. Other uses of the first set of WUSUV are also possible.

Figure 8:
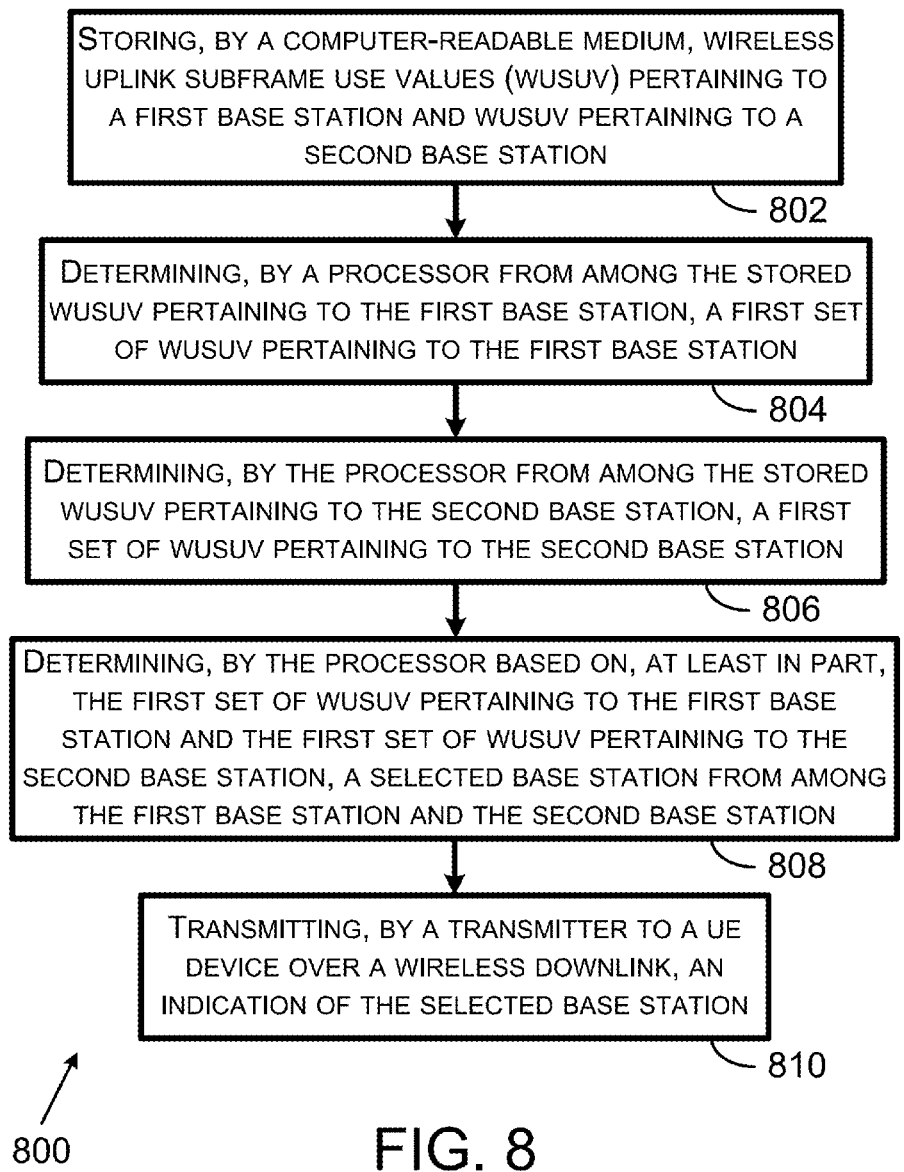
FIG. 8 is a flowchart depicting another set of functions that can be carried out in accordance with the example embodiments described herein.

Next, FIG. 8 depicts a flowchart showing a set of functions (e.g., operations) 800 (or more simply, "the set 800") that can be carried out in accordance with the example embodiments disclosed herein. The functions of the set 800 are shown within blocks labeled with even integers between 802 and 810, inclusive. The functions of the set 800 refer to a first base station and to a second base station, but will be described as being performed by elements of the first base station. With regard to the set 800, this description refers to the first base station as base station 104 and the second base station as base station 106. The first base station (e.g., base station 104) can be configured like base station 500 such that performance of any function described herein with respect to a function of the set 800 can include a processor, such as processor 502, executing program instructions, such as CRPI 510, to perform at least a portion of the function.

Other function(s) disclosed in this description can be performed prior to, while, or after performing any one or more of the functions of the set 800. Those other function(s) can be performed in combination with or separately from any one or more of the functions of the set 800.

Block 802 includes storing, by a computer-readable medium, WUSUV pertaining to a first base station and WUSUV pertaining to a second base station. Each WUSUV pertaining to the first base station can represent use of a predetermined number of sub-carriers of base station 104 during a single transmission segment, and each WUSUV pertaining to the second base station can represent use of a predetermined number of sub-carriers of base station 106 during a single transmission segment. Computer-readable medium 506 can repeatedly store WUSUV pertaining to base stations 104 and 106 for each successive transmission segment. Computer-readable medium 506 can store the WUSUV using a first-stored, first-overwritten, process, but is not so limited. Storing the WUSUV at block 802 can include computer-readable medium 506 storing WUSUV 512 and a transmission segment identifier corresponding to one or more of the WUSUV 512. Storing the WUSUV at block 802 can include computer-readable medium 506 storing WUSUV pertaining to the base station 104, as determined by a processor of base station 104, and WUSUV that pertain to base station 106 and are received by a receiver of base station 104 from base station 106 or another device of system 100.

Next, block 804 includes determining, by a processor from among the stored WUSUV pertaining to the first base station, a first set of WUSUV pertaining to the first base station. The first set of WUSUV pertaining to the first base station can include the WUSUV 306 (i.e., 0, 10, 10, 10, 2, 10, 10, 5, 10, 10) for coverage area 1 in FIG. 3. Processor 502 can determine one or more other sets of WUSUV pertaining to base station 104. For example, processor 502 can determine a second set of WUSUV pertaining to base station 104 for transmission segments numbered 11 to 20 that occur after transmission segments 1 to 10, a third set of WUSUV pertaining to base station 104 for transmission segments numbered 21 to 30 that occur after transmission segments 11 to 20, and a fourth set of WUSUV pertaining to base station 104 for transmission segments numbered 31 to 40 that occur after transmission segments 21 to 30.

Next, block 806 includes determining, by the processor from among the stored WUSUV pertaining to the second base station, a first set of WUSUV pertaining to the second base station. The first set of WUSUV pertaining to the second base station can include the WUSUV 310 (i.e., 10, 9, 5, 9, 10, 9, 3, 8, 9, 5) for coverage area 2 in FIG. 3. Processor 502 can determine one or more other sets of WUSUV pertaining to base station 106. For example, processor 502 can determine a second set of WUSUV pertaining to base station 106 for transmission segments numbered 11 to 20 that occur after transmission segments 1 to 10, a third set of WUSUV pertaining to base station 106 for transmission segments numbered 21 to 30 that occur after transmission segments 11 to 20, and a fourth set of WUSUV pertaining to base station 106 for transmission segments numbered 31 to 40 that occur after transmission segments 21 to 30.

Next, block 808 includes determining, by the processor based on, at least in part, the first set of WUSUV pertaining to the first base station and the first set of WUSUV pertaining to the second base station, a selected base station from among the first base station and the second base station. For example, processor 502 may select the base station based on the load of an uplink of one of the base stations being less than the load of the uplink of the other base station. As an example, the load for each base station can include a sum of the WUSUV for a predetermined number of transmission segments, such as transmission segments.

As another example, processor 502 may determine an application requirement for UE device 102 from application requirements 514 and determine whether UE device 102 is operating within the cell edge area of base station 104 or base station 106. Processor 502 may further base its selection of a base station from among the first and second base stations based on the determined application requirement and the determination that indicates whether UE device 102 is operating in the cell edge area of the first and second base stations.

For example, UE device 102 may be operating at an edge of a coverage area provided by base station 104. UE device 102 may be executing or may have initiated an application that requires ten resource blocks in an RF uplink transmission segment window (e.g., a window corresponding to ten subframes) in order to maintain a required data rate for the application. Since UE device 102 is operating at the cell edge, UE device 102 may be operating with a power constraint that limits UE device 102 to using one uplink RF resource block per transmission segment. With such constraint in place, UE device 102 may need to use one uplink RF resource block for ten consecutive transmission segments in order to meet the required data rate during the transmission segment window.

The RF uplink usage shown in diagram 408 would permit allocating one RF resource block per transmission segment, but the RF uplink usage shown in diagram 410 would not permit allocating one RF resource block per transmission segment because only the first transmission segment had unused resource blocks. Based on those use values corresponding to coverage areas 1 and 2, processor 502 can use the use values to determine coverage area 1 provided by base station 104 can satisfy the required data rate for the application of UE device 102. Accordingly, processor 502 can select base station 104.

If processor 502 determines that both coverage areas 1 and 2 could satisfy the required data rate for the application of UE device 102, processor 502 can determine that one of the first base station and the second base station has a smaller load and accordingly select the base station that can satisfy the data rate requirement and that has the smaller load compared to the other base station.

Next, block 810 includes transmitting, by a transmitter to a UE device over a wireless downlink, an indication of the selected base station. As an example, processor 502 can execute program instructions of CRPI 510 to generate a message including the indication of the selected base station, such as a MIB or SIB message, and cause transceiver 504 to transmit the message including the indication of the selection base station over a wireless downlink to UE device 102. If UE device 102 is in idle mode and camped on base station 104 and if the selected base station is base station 104, UE device 102 can continue to camp on base station 104, but if the selected base station is another base station, such as base station 106, UE device 102 can switch from camping on base station 104 in the idle mode to camping on base station 106 in the idle mode. If UE device 102 is connected to base station 104 and if the selected base station is base station 104, UE device 102 can remain connected to base station 104, but if the selected base station is another base station, such as base station 106, UE device 102 can handover from base station 104 to base station 106.

Figure 9:
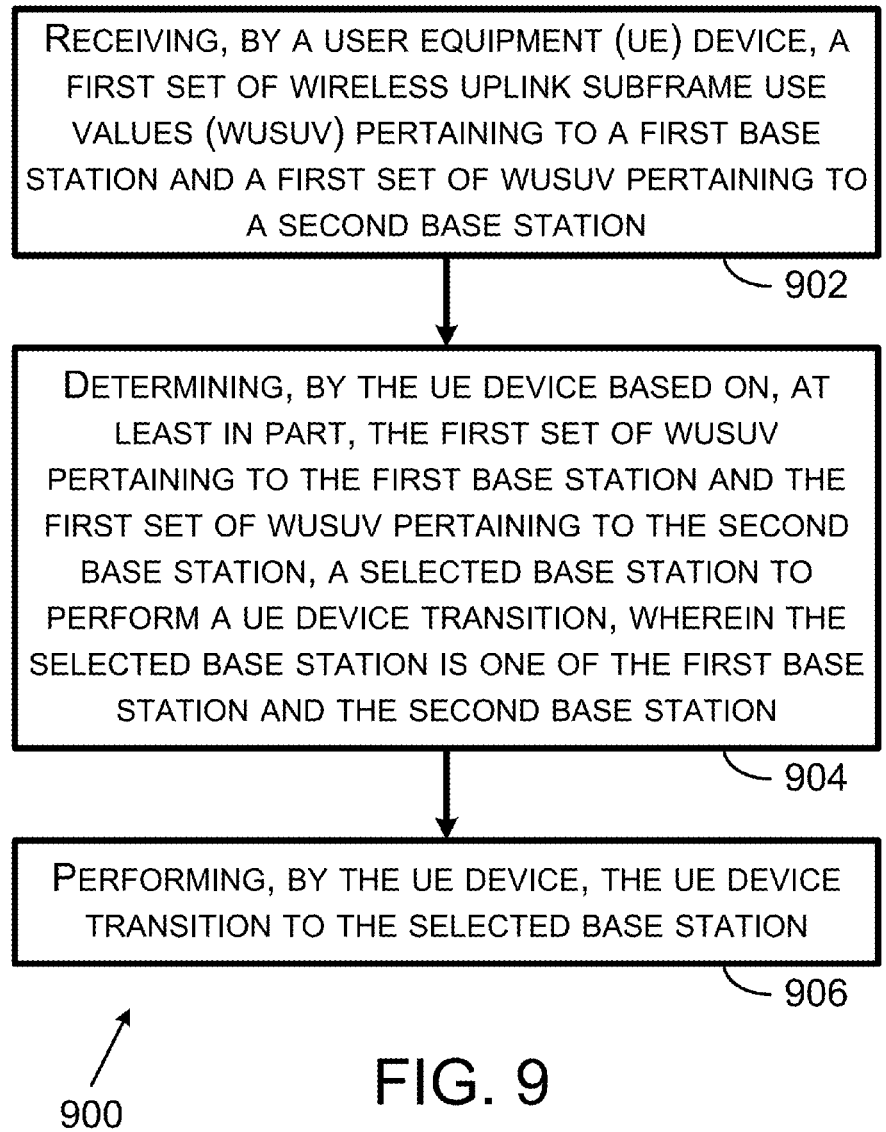
FIG. 9 is a flowchart depicting another set of functions that can be carried out in accordance with the example embodiments described herein.

Next, FIG. 9 depicts a flowchart showing a set of functions (e.g., operations) 900 (or more simply, "the set 900") that can be carried out in accordance with the example embodiments disclosed herein. The functions of the set 900 are shown within blocks labeled with even integers between 902 and 906, inclusive. The functions of the set 900 refer to a UE device, a first base station, and a second base station. With regard to the set 900, this description refers to the UE device as UE device 102, the first base station as base station 104, and the second base station as base station 106. The functions of the set 900 can be carried out using UE device 102 or a component thereof such that performance of any function described herein with respect to the set 900 can include a processor, such as processor 602, executing program instructions, such as CRPI 612, to perform at least a portion of the function.

Other function(s) disclosed in this description can be performed prior to, while, or after performing any one or more of the functions of the set 900. Those other function(s) can be performed in combination with or separately from any one or more of the functions of the set 900.

Block 902 includes receiving, by a UE device, a first set of WUSUV pertaining to a first base station and a first set of WUSUV pertaining to a second base station. Transceiver 606 can receive the first set of WUSUV (e.g., WUSUV 306) pertaining to base station 104 from base station 104. Similarly, transceiver 606 can receive the first set of WUSUV (e.g., WUSUV 310) pertaining to base station 106 from base station 106. Transceiver 606 can transmit the received WUSVU 306 and WUSUV 310 to processor 602 using connection mechanism 610. Processor 602 can execute CRPI 612 to store the received WUSUV as part of WUSUV 614.

WUSUV 306 and WUSUV 310 each include ten WUSUV. The receiving function at block 902 is not limited to receiving a set of WUSUV with ten WUSUV. For example, the first sets of WUSUV pertaining to either base station 104 or base station 106 can include a number of WUSUV less than ten or greater than ten.

Receiving the first set of WUSUV pertaining to base station 104 can include receiving a message that includes an identifier of base station 104, the WUSUV pertaining to base station 104, and the transmission segment identifiers, as shown in message content 310 or message content 314. Similarly, receiving the first set of WUSUV pertaining to base station 106 can include receiving a message that includes an identifier of base station 106, the WUSUV pertaining to base station 106, and the transmission segment identifiers, as shown in message content 312 or message content 316.

Next, block 904 includes determining, by the UE device based on, at least in part, the first set of WUSUV pertaining to the first base station and the first set of WUSUV pertaining to the second base station, a selected base station to perform a UE device transition, wherein the selected base station is one of the first base station and the second base station. UE device 102 can execute the base station selection CRPI to select the base station.

Next, block 906 includes performing, by the UE device, the UE device transition to the selected base station. Performing the UE device transition can include UE device 102, while operating in an idle mode, transitioning from camping on base station 104 to camping on base station 106 or continuing to camp on the selected base station if UE device 102 is already camped on the selected base station. Camping on a base station can include acquiring a MIB message and SIB message from that base station. When connection services are desired, UE device 102 can establish a connection (e.g., a radio resource connection) with the base station on which it is camping. Performing the UE device transition can include UE device 102, while operating in a connected mode, handing over from base station 104 to base station 106.

III. Conclusion

Example embodiments have been described above. Those skilled in the art will understand that changes and modifications can be made to the described embodiments without departing from the true scope and spirit of the present invention, which is defined by the claims.

The invention claimed is:

1. A base station comprising:
 a computer-readable medium containing wireless uplink subframe use values (WUSUV) pertaining to a first base station and WUSUV pertaining to a second base station, wherein the WUSUV pertaining to the first base station are indicative of using subframes of wireless uplink resources to the first base station, and wherein the WUSUV pertaining to the second base station are indicative of using subframes of wireless uplink resources to the second base station;
 at least one processor coupled to the computer-readable medium and programmed to:
  (i) determine, from among the stored WUSUV pertaining to the first base station, a first set of WUSUV pertaining to the first base station; and
  (ii) determine, from among the stored WUSUV pertaining to the second base station, a first set of WUSUV pertaining to the second base station; and
  (iii) determine, based at least in part on the first set of WUSUV pertaining to the first base station and the first set of WUSUV pertaining to the second base station, a selected base station to perform a user equipment (UE) device transition, and
 a transmitter to transmit to a particular UE device over a wireless downlink an indication of the selected base station to perform the UE device transition.

2. The base station of claim 1,
 wherein the first set of WUSUV pertaining to the first base station includes values indicating at least one of a use of a wireless uplink to the first base station and a non-use of the wireless uplink to the first base station, and
 wherein the first set of WUSUV pertaining to the second base station includes values indicating at least one of a use of a wireless uplink to the second base station and a non-use of the wireless uplink to the second base station.

3. The base station of claim 1,
 wherein both the first set of wireless uplink use values pertaining to the first base station and the first set of wireless uplink use values pertaining to the second base station include at least one transmission segment identifier corresponding to a common transmission segment window.

4. The base station of claim 1, wherein the at least one processor determines the selected base station based on the at least one processor determining whether the first set of WUSUV pertaining to the first base station or the first set of WUSUV pertaining to the second base station has a greatest number of subframes with a common number of available resource blocks.

5. The base station of claim 4, wherein the common number of available resource blocks equals one resource block.

6. The base station of claim 4,
 wherein the first set of WUSUV pertaining to the first base station and the first set of WUSUV pertaining to the second base station indicate an equal number of subframes having resource block available, and
 wherein the common number of available resources blocks is greater than one.

7. The base station of claim 1,
 wherein the selected base station is the first base station, and
 wherein the UE device transition comprises handing over the particular UE device from the first base station to the second base station or handing over the particular UE device from the second base station to the first base station.

8. The base station of claim 1, wherein the indication of the selected base station to perform the UE device transition is contained within a master information block or a system information block transmitted by the transmitter.

9. A method comprising:
 storing, by a computer-readable medium of a first base station, wireless uplink subframe use values (WUSUV) pertaining to a first base station and WUSUV pertaining to a second base station, wherein the WUSUV pertaining to the first base station are indicative of using subframes of wireless uplink resources to the first base station, and wherein the WUSUV pertaining to the second base station are indicative of using subframes of wireless uplink resources to the second base station;
 determining, by a processor of the first base station from among the stored WUSUV pertaining to the first base station, a first set of WUSUV pertaining to the first base station;
 determining, by the processor from among the stored WUSUV pertaining to the second base station, a first set of WUSUV pertaining to the second base station;
 determining, by the processor based at least in part on the first set of WUSUV pertaining to the first base station and the first set of WUSUV pertaining to the second base station, a selected base station to perform a user equipment (UE) device transition; and
 transmitting, by a transmitter of the first base station to a UE device over a wireless downlink, an indication of the selected base station to perform the UE device transition.

10. The method of claim 9, further comprising:
 determining, by the processor, an application requirement for an application executing by the UE device or for an application to be executed by the UE device,
 wherein determining the selected base station is further based upon the application requirement.

11. The method of claim 10, wherein the application requirement includes a required data rate for a transmission segment window.

12. The method of claim 9, further comprising:
determining, by the processor, the UE device is within an edge of a coverage area provided by one of the first base station, the second base station, and a third base station,
wherein determining the selected base station is further based upon the processor determining the UE device is within the edge of the coverage area.

13. The method of claim 9, wherein both the first set of WUSUV pertaining to the first base station and the first set of WUSUV pertaining to the second base station correspond to a common transmission segment window.

14. The method of claim 9,
wherein the selected base station is the first base station, and
wherein the UE device transition comprises handing over the particular UE device from the first base station to the second base station or handing over the particular UE device from the second base station to the first base station.

15. The method of claim 9,
wherein the first set of WUSUV pertaining to the first base station are indicative of prior use and/or non-use of the subframes of wireless uplink resources to the first base station, and
wherein the first set of WUSUV pertaining to the second base station are indicative of prior use and/or non-use of the subframes of wireless uplink resources to the second base station.

16. The method of claim 9,
wherein the first set of WUSUV pertaining to the first base station are indicative of a pattern of expected use and/or non-use of the subframes of wireless uplink resources to the first base station,
wherein the pattern of expected use of the subframes of wireless uplink resources to the first base station is based on a prior use and/or non-use of the subframes of wireless uplink resources to the first base station,
wherein the first set of WUSUV pertaining to the second base station are indicative of a pattern of expected use and/or non-use of the subframes of wireless uplink resources to the second base station, and
wherein the pattern of expected use of the subframes of wireless uplink resources to the second base station is based on a prior use and/or non-use of the subframes of wireless uplink resources to the second base station.

17. A method comprising:
receiving, by a user equipment (UE) device, a first set of wireless uplink subframe use values (WUSUV) pertaining to a first base station and a first set of WUSUV pertaining to a second base station, wherein the WUSUV pertaining to the first base station are indicative of using subframes of wireless uplink resources to the first base station, and wherein the WUSUV pertaining to the second base station are indicative of using subframes of wireless uplink resources to the second base station;
determining, by the UE device based at least in part on the first set of WUSUV pertaining to the first base station and the first set of WUSUV pertaining to the second base station, a selected base station to perform a UE device transition, wherein the selected base station is one of the first base station and the second base station; and
performing, by the UE device, the UE device transition to the selected base station.

18. The method of claim 17, wherein performing the UE device transition includes the UE device handing over from a current base station serving the UE device to the selected base station.

19. The method of claim 17, wherein performing the UE device transition includes the UE device establishing a radio resource control connection to the selected base station.

20. The method of claim 17, wherein performing the UE device transition includes the UE device beginning or continuing to camp on the selected base station.

21. The method of claim 17, further comprising:
determining, by the UE device, an application requirement for an application executing by the UE device or for an application to be executed by the UE device,
wherein determining the selected base station is further based upon the application requirement.

22. The method of claim 17, further comprising:
receiving, by the UE device, a second set of WUSUV pertaining to the first base station and a second set of WUSUV pertaining to the second base station,
wherein determining the selected base station is further based upon at least a portion of the second set of WUSUV pertaining to the first base station combined with the first set of WUSUV pertaining to the first base station, and
wherein determining the selected base station is further based upon at least a portion of the second set of WUSUV pertaining to the second base station combined with the first set of WUSUV pertaining to the second base station.

23. The method of claim 17,
wherein the first set of WUSUV pertaining to the first base station are indicative of prior use and/or non-use of the subframes of wireless uplink resources to the first base station, and
wherein the first set of WUSUV pertaining to the second base station are indicative of prior use and/or non-use of the subframes of wireless uplink resources to the second base station.

24. The method of claim 17,
wherein the first set of WUSUV pertaining to the first base station are indicative of a pattern of expected use and/or non-use of the subframes of wireless uplink resources to the first base station,
wherein the pattern of expected use of the subframes of wireless uplink resources to the first base station is based on a prior use and/or non-use of the subframes of wireless uplink resources to the first base station,
wherein the first set of WUSUV pertaining to the second base station are indicative of a pattern of expected use and/or non-use of the subframes of wireless uplink resources to the second base station, and
wherein the pattern of expected use of the subframes of wireless uplink resources to the second base station is based on a prior use and/or non-use of the subframes of wireless uplink resources to the second base station.

25. A user equipment device comprising:
a receiver to receive a first set of wireless uplink subframe use values (WUSUV) pertaining to a first base station and a first set of WUSUV pertaining to a second base station, wherein the WUSUV pertaining to the first base station are indicative of using subframes of wireless uplink resources to the first base station, and wherein the WUSUV pertaining to the second base station are indicative of using subframes of wireless uplink resources to the second base station;

a computer-readable medium to store the received first set of WUSUV pertaining to the first base station and the first set of WUSUV pertaining to the second base station; and at least one processor programmed to:
(i) determine, based at least in part on the first set of WUSUV pertaining to the first base station and the first set of WUSUV pertaining to the second base station, a selected base station to perform a UE device transition, wherein the selected base station is one of the first base station and the second base station; and
(ii) perform the UE device transition to the selected base station.

* * * * *